Patented June 13, 1944

2,351,333

UNITED STATES PATENT OFFICE 2,351,333

6-(p-AMINOBENZENE SULPHONYL)-AMINO-2:4-DIMETHYLPYRIMIDINE AND ITS MANUFACTURE

Hans Gysin, Basel, Switzerland, assignor to J. R. Geigy A. G., Basel, Switzerland, a firm No Drawing. Application October 2, 1941, Serial No. 413,381. In Switzerland October 11, 1940

1 Claim. (Cl. 260—239.6)

It has been found that the 6-(p-aminobenzene sulphonyl)-amino-2:4-dimethylpyrimidine possesses valuable therapeutic properties.

The new compound is prepared by acylating 6-amino-2:4-dimethylpyrimidine (kyanmethine) with a reactive benzene sulphonic acid derivative containing in p-position a substituent convertible into a primary amino group and then converting the p-positioned substituent into a free amino group. The reaction can be carried out in an aqueous medium or in a medium being free from water, for instance in organic solvents and diluents.

As reactive benzene sulphonic acid derivatives with p-positioned substituents convertible into an amino group, there are suitable for example p-nitrobenzene sulphochloride, p-acetylaminobenzene sulphochloride, 4-carbethoxy aminobenzene sulphochloride and so on; but there can also be used other substitution products such as the 4-chlorobenzene sulphochloride.

These 6-acylamino-2:4-dimethylpyrimidine derivatives may be converted into the 6-(p-aminobenzene sulphonyl)-amino-2:4-dimethylpyrimidine by suitable measures such as by reduction, saponification, reductive splitting off, interaction with ammonia and so forth.

A solvents and diluents hydro-carbons, halogen-hydro-carbons as well as ketones and so on come into question. The halogen-hydracid becoming free can be combined by means of organic or inorganic bases or basic reacting compounds.

The present invention is illustrated but not limited by the following example. The parts are by weight, unless otherwise stated.

Example 1 molecule of pure kyanmethine is suspended in 300 parts by volume of anhydrous pyridine and 1 molecule of p-nitrobenzene sulphochloride, dissolved in chloroform, is dropped thereinto. Overnight, there is boiled under reflux, then chloroform and pyridine are blown off with steam and the aqueous solution is filtered hot. On cooling down, the nitro compound separates out. It is recrystallised from dilute alcohol, M. P. 201° C.

22 parts of this compound are catalytically reduced at room temperature in 500 parts by volume of alcohol and 50 parts by volume of water by means of nickel and hydrogen. The reaction being completed, there is filtered off from remaining catalyst, the filtrate is evaporated and the residue recrystallised from dilute alcohol. One obtains fine colorless needles of M. P. 243° C.

Instead of p-nitrobenzene sulphochloride, the p-acetylaminobenzene sulphochloride can also be used. By saponification there is obtained the 6-(p-aminobenzenesulphonyl)-2:4-dimethylpyrimidine.

What I claim is:

The 6-(p-aminobenzenesulphonyl)-amino-2:4-dimethylpyrimidine of the following formula

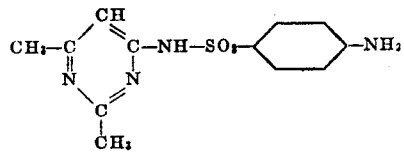

prepared as a therapeutic being fine colorless needles when crystallised from alcohol, of the melting point 243° C.

HANS GYSIN.